United States Patent [19]

Hillstrom

[11] 4,060,157
[45] Nov. 29, 1977

[54] CONTROL MECHANISM

[75] Inventor: Thomas P. Hillstrom, Hinsdale, Ill.

[73] Assignee: International Harvester Company, Chicago, Ill.

[21] Appl. No.: 715,749

[22] Filed: Aug. 20, 1976

[51] Int. Cl.² .................................................. G05G 9/16
[52] U.S. Cl. ............................... 192/4 A; 74/473 R; 74/475; 74/476
[58] Field of Search ............. 192/4 A; 74/473 R, 475, 74/476

[56] References Cited
U.S. PATENT DOCUMENTS

| 3,465,612 | 9/1969 | Letwin et al. | 74/473 R |
| 3,800,924 | 4/1974 | Hansen | 192/4 A |
| 3,994,184 | 11/1976 | Osborn | 74/473 R |

*Primary Examiner*—Allan D. Herrmann
*Attorney, Agent, or Firm*—William H. Wendell; Floyd B. Harman

[57] ABSTRACT

A vehicle control mechanism for manipulating three controllable members through one control handle. The control mechanism includes a support rigidly attached to the vehicle. The support rotatably carries three control assemblies which are operably connected to one of each of the three controllable members. The control mechanism also includes a drive assembly rotatably carried by the first and third control assemblies first, second and third control assemblies and the support have force selectively transmitted therebetween by a roller which is contained in the control assembly by roller retainers of the support. The force which manipulates the controllable members is derived from the operator selectively pivoting the handle about the third control assembly. To manipulate the various control assemblies the operator will either pivot the handle to engage the handle and the dive assembly or pivot the handle to engage the handle and the second control assembly. The controlling force is supplied to the respective control members by the operators rotation of the handle about its rotational connection to the third control assembly; after the handle has been selectively pivoted about its pivot point. The final features of the control mechanism are a centering spring which urges the handle into a normal position about its pivot point, which normal position cooperates with a regulator that produces selective engagement of the individual controllable members by sequential pivoting and rotation of the handle.

20 Claims, 8 Drawing Figures

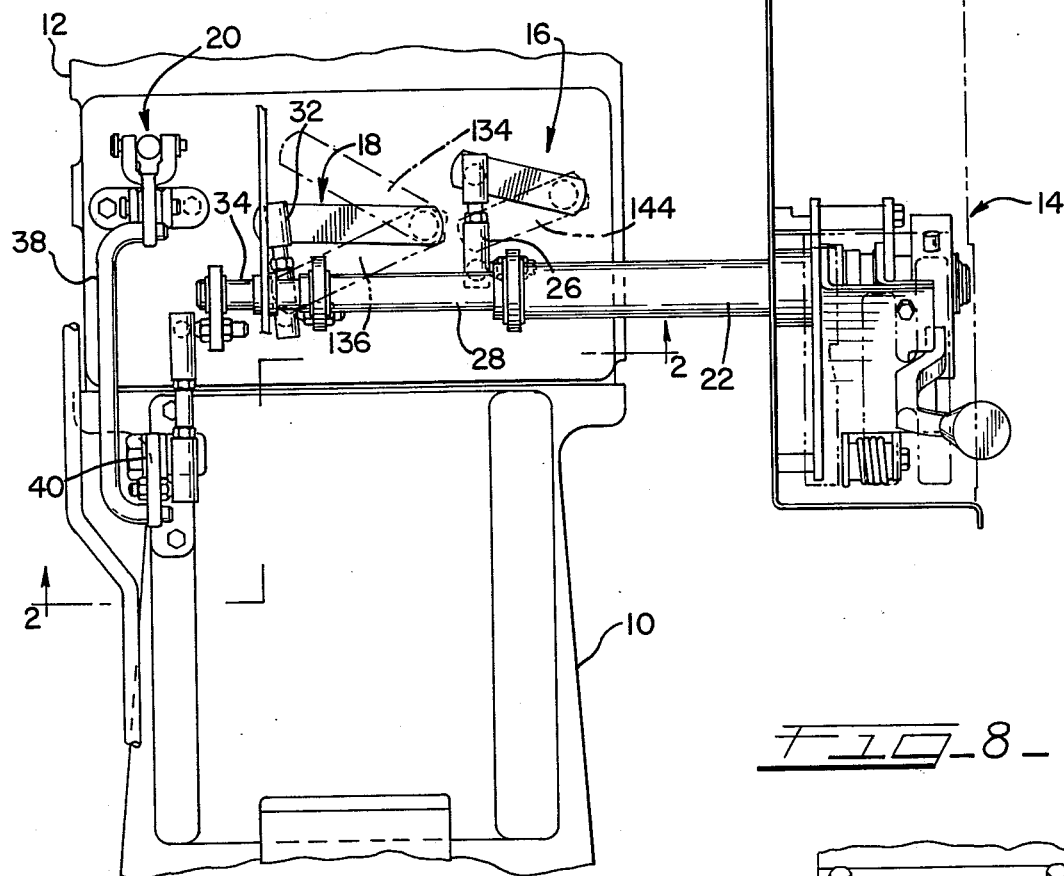
FIG-1-
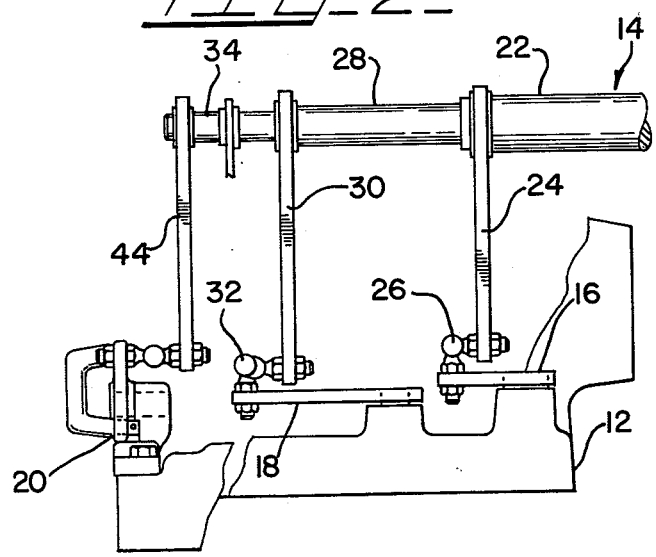
FIG-2-
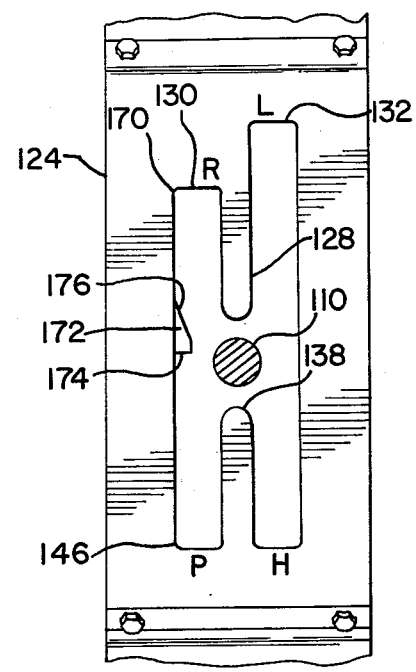
FIG-8-

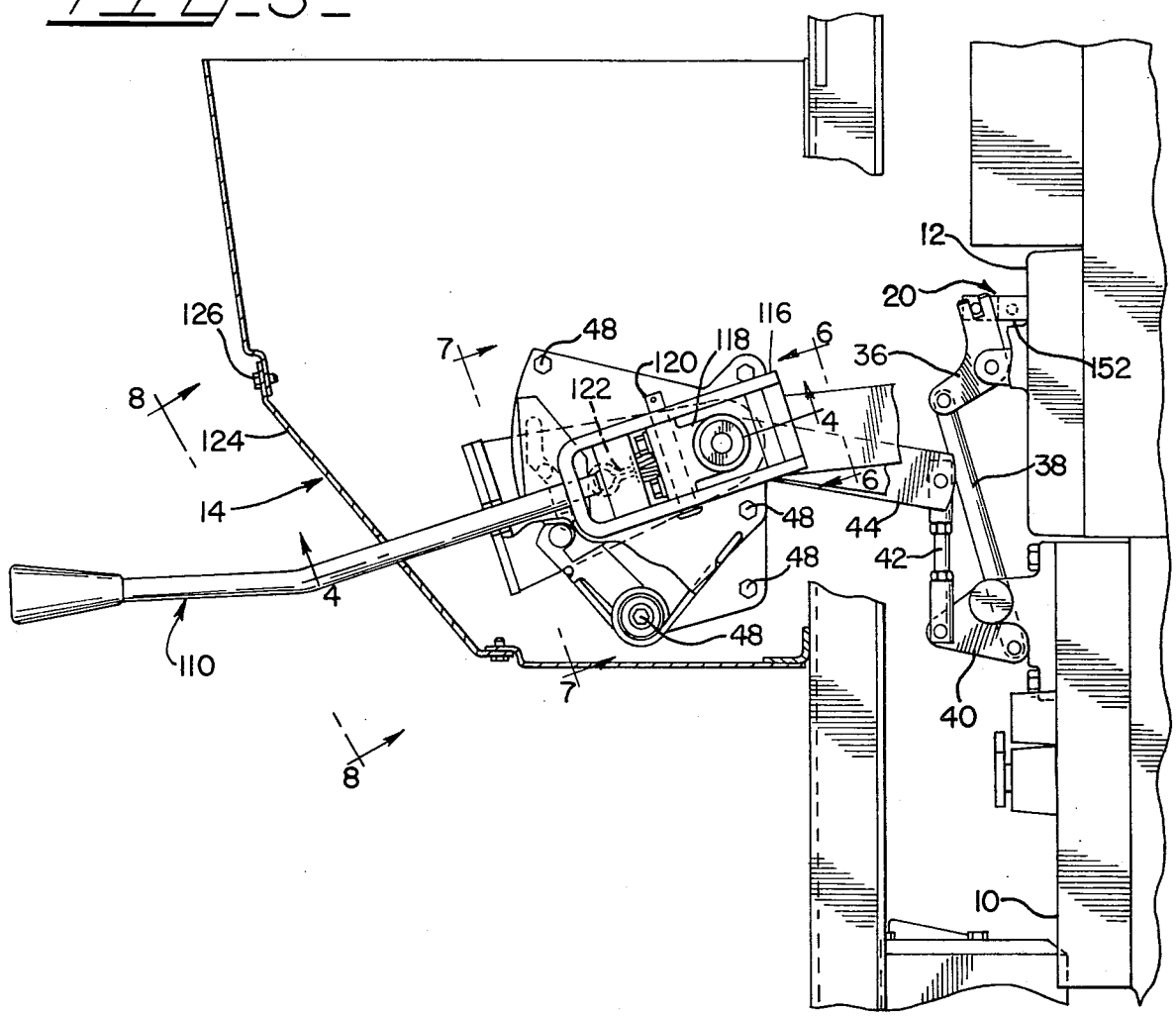

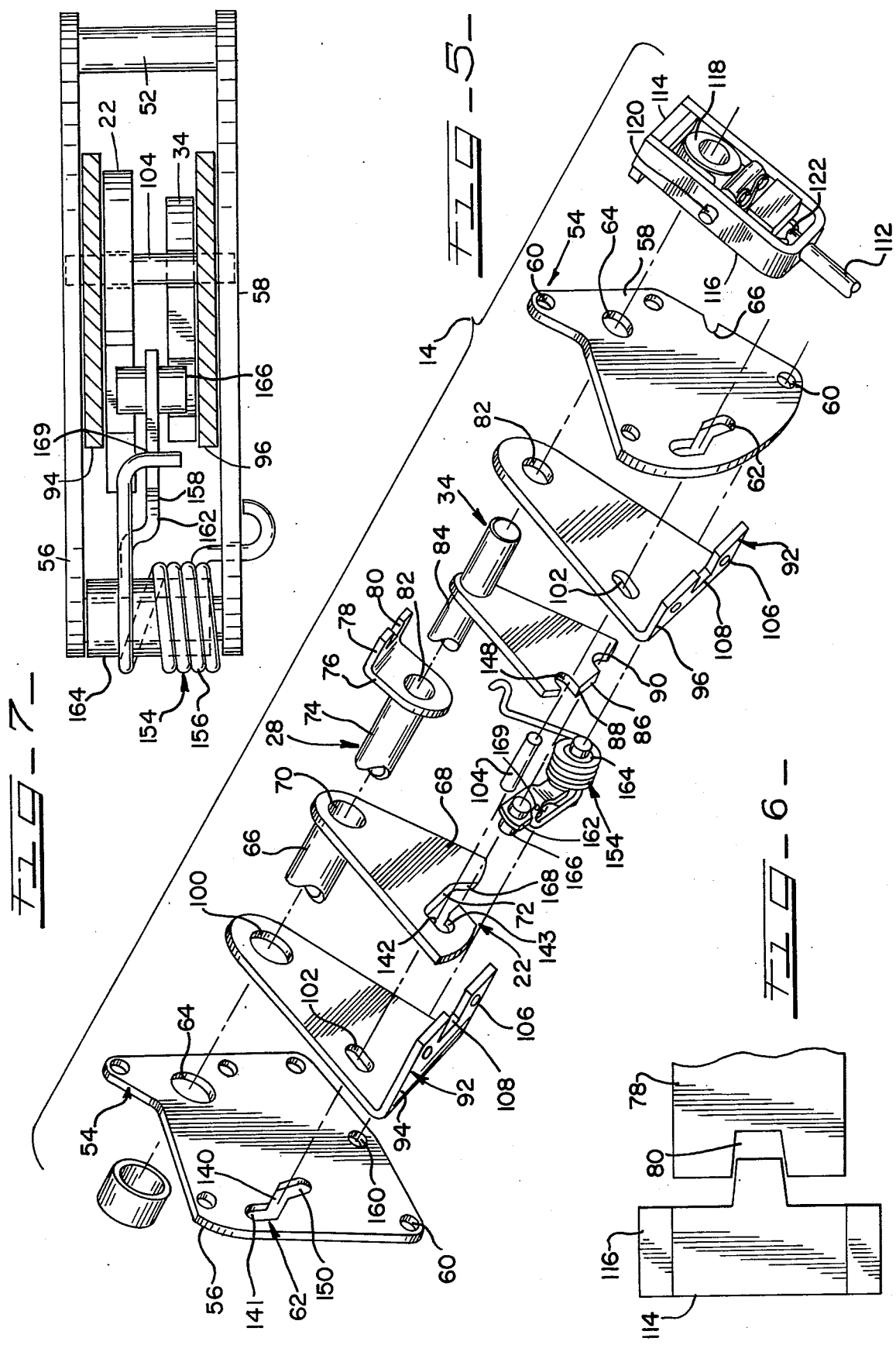

CONTROL MECHANISM

BACKGROUND OF THE INVENTION

This invention relates generally to the control of plurality of controllable element by a single handle and, more particularly, concerns a mechanism for selecting a plurality of modes of a range-speed transmission.

In vehicles having a range-speed transmission combination, the conventional controls combine the high-low range and reverse selectors in a single lever arrangement, and have a separate lever for the park gear lock control. This conventional combination does provide effective transmission control, but it also presents the vehicle operator with a plurality of levers to perform the desired selections. With the increase sophistication recently developed in controllable vehicle functions, the operators are faced with an everincreasing number of levers which they must manipulate to efficiently operate the vehicle. Accordingly, it is the primary aim of the present invention to provide a control mechanism which minimizes the operator's control levers by creating a mechanism which performs three control functions through one lever.

Moreover, an additional object of the present invention is to provide such a mechanism in a compact form which is compatible to the operator compartment of the vehicle.

Additionally, it is an object of the invention to provide a control mechanism which can accommodate a detent arrangement to secure the linkage controlling a particular vehicle functions.

SUMMARY OF THE INVENTION

In accordance with invention there is provided a control mechanism for a vehicle including a support rigidly attached to the vehicle having a cam aperture, a roller retainer and a shaft aperture. The mechanism further includes a first control assembly rotatably carried by the support's shaft aperture accepting the first control assemblies tubular section, with the first control assembly also having a cam slot. The first control assembly is operably connected to a first controllable member that is movable through a control range by rotation of the first control assembly. The control mechanism also includes a second control assembly rotatably carried by the first control assembly's tubular section accepting the second control assembly's conduit section, with the second control assembly having a tooth notch. A second control assembly is operably connected to a second controllable member which is movable through a control range by rotation of the second control assembly. The third and final control assembly of the mechanism is rotatably carried by the second control assembly's conduit section accepting the third control assembly's shaft section, with the third control assembly having a cam groove. The third control assembly is operably connected to a third control member which is movable through a control range by rotation of the third control assembly.

In addition, the control mechanism also includes a drive assembly rotatably carried by the tubular and shaft sections of the first and third control assemblies, with the drive assembly incorporating a roller slot and a handle notch. The support, drive assembly, first control assembly and third control assembly form a selective force transmitting chain by the placement of a roller constrained by the roller retainers in a position within the cam aperture, the cam slot, the cam groove, and the roller slot.

The mechanism further includes a handle rotatably and pivotally carried by the shaft section, with the handle including a rod selectively engageable with the handle notch and an extension selectively engageable with the tooth notch upon pivotal movement of the handle. The handle is mounted on the shaft section by a mounting structure which is pivotally and resiliently attached to the handle and is itself journalled to the shaft section, with the mounting structure including a centering spring that urges the handle to a normal position relative to the pivotal connection.

Lastly, the control mechanism includes a regulator for controlling movement of the handle by selective engagement of the tooth notch or the handle notch by the handle. The regulator is operative, when the handle extension engages the tooth notch, to produce rotation of the second control assembly, and operative, when the handle rod engages the handle notch, to produce selective rotation of the first and third control assemblies by interaction of the roller and the cam aperture, the roller slot, the cam groove, and the cam slot.

BRIEF DESCRIPTION OF THE DRAWINGS

Other objects and advantages of the invention will become apparent upon reading the following detailed description and upon reference to the drawings, in which:

FIG. 1 is a plan view of the control mechanism and the members controllable thereby.

FIG. 2 is a section view on line 2—2 of FIG. 1.

FIG. 3 is a side view of the control mechanism and the members controlled thereby.

FIG. 4 is a section view on line 4—4 of FIG. 3.

FIG. 5 is an exploded view of the control mechanism elements.

FIG. 6 is a section view on line 6—6 of FIG. 3.

FIG. 7 is a section view on line 7—7 of FIG. 3.

FIG. 8 is a section view on line 8—8 of FIG. 3.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

The control mechanism of the present invention was conceived to incorporate the high and low range selection, the reverse mode selection and the park selection of a vehicle incorporating a speed transmission 10 and a range transmission 12. As shown in FIGS. 1, 2, and 3 the preferred embodiment's control mechanism 14 is connected through a series of links to the controllable members of the range transmission 12. The first controllable member 16 is a reverse lever that establishes whether the range transmission is in a neutral or a reverse mode. The second controllable member 18 is a range lever that determines whether the range transmission is in its neutral, high or low forward mode. The third controllable member 20 of the range transmission is a park lever that determines whether the park gear lock is engaged or disengaged.

In the illustrated, form the first control assembly 22 is connected to the first controllable member 16 by rigidly attachingly link 24 to the control assembly 22 and connecting link 24 to the control member 16 through an adjustable link 26. As also shown in FIGS. 1 and 2, the second control assembly 28 is connected to the second controllable member 18 by rigidly connecting link 32 the control assembly 28 and by connecting link 30 to the second control member 18 through an adjustable link 32.

In the present instance, the linkage arrangement connecting the third control member 20 to the third control assembly 34 requires examination of FIGS. 1, 2, and 3 for a full explanation. As shown in these views, the third control member 20 engages or disengages the parking gear lock which in the preferred embodiment is a conventional engagement biased lever arrangement within the range transmission 12. Although the park gear lock internal arrangement is not shown in the figures, it is basically a spring bias lever which engages the tooth of a gear within the transmission to prevent any rotation of the gearing in the transmission after engagement. As best depicted in FIG. 3, which shows the third control member 20 in its disengaged position, the slidable lever 36 of the internal lock arrangement is connected to the third control assembly via the bellcrank 36, rod 38, bellcrank 40, adjustable rod 42 and lever 44, with lever 44 being rigidly connected to the third control assembly 34.

In the particular device illustrated the control mechanism 14 which positions the first, second, and third control members through the first, second, and third control assemblies is shown in detail in FIGS. 4, 5, 6, 7, and 8. Turning first to FIG. 4 it will be seen that the control mechanism 14 is secured to the vehicle 46 by a plurality of bolts 48, nuts 50, and spacers 52, the securing being shown in FIG. 3. This plurality of fasteners directly connects the support 54 to the vehicle 46 with the support providing the major base for the other elements of the control mechanism.

As best shown in FIG. 5, the support includes an internal plate 56 and an external plate 58. Both plates 56 and 58 contain corresponding bolt mounting apertures 60 and a cam aperture 62. They both also contain shaft apertures 64, with the diameter of this aperture in the inside plate being larger than the diameter of the aperture in the outside plate. In addition to the diameter variance in a shaft apertures of the inside and outside plates, the outside plate also contains a spring notch 66 which the inside plate does not contain.

The diameter of the aperture 64 on the inside plate is larger to accommodate the tubular sections 66 of the first control assembly 22. It is this tubular section which is connected to the lever 24 to operate the first control member 16. In addition to this tubular section 66, the first control assembly 22 also includes a plate 68 which is substantially perpendicular to the tubular section 66. As shown in FIG. 5, the plate 68 and the tubular section 66 have an aperture 70 therethrough, with the plate 68 also having a cam slot 72 in alignment with cam aperture 62 when the tubular section 66 passes through the shaft aperture 64.

The aperture 70 of the first control assembly 22 is sized to accept a passage of the conduit section 74 of the second control assembly 28. It is this conduit section 74 which is connected to the lever 30 to drive the second control member 18. In addition to the conduit section 74, the second control member 28 includes a plate 76 which is substantially perpendicular to the conduit section 74. The plate 76 also includes a portion 78 which is substantially parallel to the conduit section 74, with the portion 76 containing a tooth notch 80. In a construction which is similar to that of the first control assembly 22, the second control assembly 28 has an aperture 82 passing therethrough.

This aperture 82 is of sufficient diameter to accept the shaft section 84 of the third control assembly 34. The third control assembly also includes a plate 86 which is substantially perpendicular to the shaft section 84 and which contains a cam groove 88 and a detent notch 90.

When the third control assembly is positioned within the second control assembly which is positioned within the first control assembly which is positioned within the inside plate 56 of the support, the cam groove 88, the cam slot 72, and the cam aperture 62 are in alignment. In the present instance the shaft section 84 of the third control assembly extends toward both the inside plate 56 and the outside plate 58 of the support 54.

The drive assembly 92 of the present invention is supported by both the shaft section 84 and the tubular section 66 of the first and third control assemblies, respectively. This is accomplished by the drive assembly 92 including an inside plate 94 and an outside plate 96 which are secured together by a pair of conventional nut and bolt fastening devices 98. Thus, in the present embodiment the inside drive plate 94 contains an aperture 100 which has the same basic diameter as the aperture 64 on the inside support plate 56. Since the outside drive plate 96 is supported by shaft section 84 which shaft section is supported by aperture 64 in the outside support plate 58, the aperture 82 in the outside drive plate 96 has the same basic diameter as the aperture 64 in the outside drive plate. Both the inside drive plate 94 and the outside drive plate 96 are substantially perpendicular to their concentric supports, but both contain a portion which is parallel to their concentric supports. Although the perpendicular sections of the drive plates contain the roller slot 102 which positions the roller 104 of the control mechanism 14, the parallel portions of the drive plates also contain the handle notch 108 and the apertures 106 through which their fastening bolts 98 pass.

In carrying out the present invention each plate of the control assemblies is rigidly connected to its respective tubular, conduit or shaft section thereby forming three solid control assemblies which can be rotated with respect to each other as a result of the concentric relationship of the shaft, conduit and tubular section in their assembled positions as depicted in FIG. 4. As also shown in FIG. 4, the support 54 substantially encloses the three control assemblies and the drive assembly, with the only protruding sections of the assembly being the parallel portions of the drive assembly 92 and the parallel portion of the second control assembly 28. It is these parallel protrusions which contain the handle notch 108 and the tooth notch 80 which are selectively engaged by the handle 110.

Pursuant to the invention the handle 110 includes a rod 112 and an extension 114. The selective engagement of the tooth notch 80 and the handle notch 108 is achieved by the mounting arrangement of the handle on the shaft section 84 which protrudes through the support 54. In the illustrated form the rod 112 and the extension 114 are rigidly attached to a U-shaped plate 116. The U-shaped plate 116 is journalled to the shaft section 84 by bushing support 118 for rotational motion about the shaft section 84. However, the U shaped plate 116 is also capable of resilient pivotal motion about an axis transverse to shaft section 84 through its connection to the bushing support 118 by pin 120 and centering spring 122. As handle 110 is pivoted about its pivot pin 120 the rod 112 will engage either the handle notch 108 (see FIG. 5) or the extension will engage the tooth notch 80 (see FIG. 6).

To insure the engagement of the handle notch or the tooth notch, the present invention incorporates a control panel 124 which is secured to the vehicle by conventional nuts and bolts 126 (see FIG. 3). The view of the control mechanism in FIG. 8 depcits the handle 110 in its normal position in the H slot 128 of the control panel 124. This position is established by the centering action of the centering spring 122 on the handle 110. From this normal the operator can pivot the handle 110 about pin 120, and then rotate the handle 110 about the shaft section 84 in either the reverse park slot 130 or the high low range slot 132. As previously described the control of the reverse and park modes of the range transmission is accomplished through the first control assembly 22 and the third control assembly 34 respectively with the selection of the high or low range of the range transmission being accomplished through the second control assembly 28.

The controlling force for the high low range selection is transmitted from the rod 110, through the plate 116, to the extension 114 and to the second control assembly 28 by engagement of extension 114 and tooth notch 180 upon pivoting of the handle 110 about pin 120 into the high low slot 132. After the operator has thus pivoted the handle, he can then rotate the handle about shaft section 84. This handle rotation will rotate the second control assembly 28, move the related linkage arrangement and rotate the high-low selector from its neutral position shown in solid line in FIG. 1 to either its high range position 134 or its low range position 136 (both shown in dotted lines in FIG. 1).

Should the operator now wish to engage either the reverse drive control 16 or the park gear lock control 20, he must rotate the handle 110 about shaft section 84 until rod 112 aligns with the short connecting slot 138. He must then pivot the handle 110 about pin 120 until the rod 112 is engaged by handle notch 108 in drive assembly 92. This engagement will provide a force transmitting connection between either the first control assembly 22 or the third control assembly 34 through interaction of the roller 104 with the roller slot 102, the cam aperture 62, and either the cam slot 72, or the cam notch 88.

As shown in FIGS. 4 and 5, the roller 104 is retained within cam aperture 62 of support 54 by roller retainers 138 which are welded to the external surfaces of support plates 56 and 58. These cam apertures 62 act as guides for the roller to raise and lower it within the roller slot 102 of the drive assembly 92 as the operator rotates the handle in the reverse-park slot 130. As the handle 110 is rotated to engage reverse, the roller is raised along the transition portion 140 of the cam aperture 62 to lift it above the cam notch 88 of the third control assembly 34. With continued rotation of the handle 110 in the same direction the roller enters the first section 141 of cam aperture 62, and engages the first radial portion 142 of cam slot 72 thereby rotating the first control assembly 22. This rotation of the first control assembly 22 moves its related linkage and shifts the reverse direction drive control 16 from its neutral position shown in solid in FIG. 1 to its reverse drive position 144 shown in dotted FIG. 1.

When the operator desires to shift the range transmission from reverse into park he will rotate the handle 110 about shaft section 84 in a direction opposite to that described immediately above. This rotation will move the roller back through the first section 141 by the interaction of the roller 104 and the roller slot 102. During this roller travel, the roller applies force to the second radial portion 143 of cam slot 72 which will rotate the first control assembly 22 towards its neutral position. Continued handle rotation will cause the roller to travel downward in the transition portion 140 until it loses contact with the second radial portion 123 upon the handle reaching connecting slot 138.

The operator must then continue to engage rod 112 and handle notch 108 by pivoting the handle about pin 120 as he continues the rotation towards the parked position 146 in the reverse park slot 130. As the operator continues to rotate the handle 110 about the shaft section 184, the transition portion 140 of cam aperture 62 will continue to force the roller 104 downward in roller slot 102 and the roller will engage the drive portion 148 of cam notch 88 in the third control assembly 34. Upon further rotation of the handle 110 about the shaft means 84, the roller will apply force to and rotate the third control assembly 34 travels through the second portion 150 of the cam aperture 62. This rotation of the third control assembly 34 will in turn move its related linkages, overcome the overcenter configuration of the bellcrank 40, the rod 38, and the bellcrank 36, and move the park gear lock actuator 20 from its disengaged position shown in solid lines in FIG. 3 to its engaged position 152 shown in dotted lines in FIG. 3.

As can be seen from the above description of the basic control mechanism of the present invention, the operator can selectively engage any of four modes of the range transmission in his vehicle by a combination of pivotal and rotational motion of a single control handle. Further, in accordance with the invention, the control mechanism can also incorporate a detent 154 as depicted in FIGS. 5 and 7. In the present instance the detent utilizes a spring 156 and a lever assembly 158 to apply a force to the first control assembly 22 and the third control assembly 34 to prevent the control assemblies from inadvertently rotating to their engaged position.

As is best shown in FIG. 5, the detent 154 is secured between the inside plate 56 and outside plate 58 of the support at aperture 160 by one of the fastening bolts 48. With the detent so positioned, the lever assembly 158 which includes a lever 162, a spacer 164 rigidly attached to the lever and a pin 166 rotatably carried by the lever, applies a restraining force to the first control assembly at the detent portion 168 of the cam slot and to the third control assembly at the detent notch 90. This restraining force is the result of the deflection of detent spring 156 that is caused by its connection to the outside support plate 58 at the spring notch 66 and the spring contact with the lever at point 169. With the detent 54 so positioned within the control mechanism, neither the first control assembly 22 or the third control assembly 34 can inadvertently rotate thereby engaging their respective control modes.

A second feature which can be incorporated into the control mechanism of the present invention is depicted in FIG. 8. When an operator starts a vehicle incorporating the present invention's control mechanism, the range transmission will have the part gear lock engaged and the operator may inadvertently rotate the handle from the park position 146 straight through to the reverse position 170. This inadvertent engagement of the reverse drive of the vehicle could produce damage to both the driver and people around the vehicle, and to the equipment itself. To avoid this possible hazard, an abutment 172 is placed in the path of the handle. The abutment is shaped to interrupt the rotation from park to reverse by having a face 174 perpendicular to this rotation while it will only deflect the rotation from reverse to park by having a sloped face 176 in the path of this rotation.

Thus, it is apparent that there has been provided in accordance with the invention, a control mechanism that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A control mechanism for a vehicle, including:
   a support rigidly attached to said vehicle, having a cam aperture with a first and second distinct elements and a transition portion therebetween, a roller retainer and a shaft aperture;
   a first control assembly rotatably carried by said support in said shaft aperture, having a tubular section through said shaft aperture and a cam slot corresponding positionally to said transition and first cam aperture elements;
   a first controllable member operably connected to and movable through a control range by rotation of said first control assembly;
   a second control assembly rotatably carried by said first control assembly in said tubular section, having a conduit section through said tubular section and a tooth notch;
   a second controllable member operably connected to and movable through a control range by rotation of said second control assembly;
   a third control assembly rotatably carried by said second control assembly in said conduit section, having a shaft section through said conduit section and a cam groove corresponding positionally to said transition portion and second element;
   a third controllable member operably connected to and movable through a control range by rotatation of said third control assembly;
   a drive assembly rotatably carried by said tubular section and said shaft section, having a roller slot and a handle notch;
   a roller constrained by said roller retainer and positioned within said transition cam element, said cam slot, said cam groove, and said cam roller slot;
   a handle rotatably and pivotally carried by said shaft section having a rod selectively engageable with said handle notch and an extension selectively engageable with said tooth notch upon pivotal movement of said handle;
   means pivotally and resiliently attached to said handle and journalled to said shaft section for mounting said handle, said means including a centering spring urging said handle to a normal position about said pivotal connection;
   means for regulating movement of said handle by selective engagement of said tooth notch or said handle notch when said handle is in its normal position about said pivotal connection and operative, when said handle extension engages said tooth notch, to produce rotation of said second control assembly, and operative, when said handle rod engages said handle notch, to produce selective rotation of said first and third control assemblies by interaction of said roller in said cam aperture, said cam roller slot, said cam groove, and said cam slot.

2. The control mechanism of claim 1, wherein:
   said handle pivotal and resilient attachments are on the rod side of said journal mount and said extension is on the opposite side of said mount, and said extension is substantially parallel to said shaft section;
   said tooth notch is aligned with said extension, and is in a portion of said second control assembly which is substantially parallel to said conduit section; and
   said handle notch is in a portion of said drive assembly which is substantially parallel to said tubular and shaft sections.

3. The control mechanism of claim 1, wherein:
   said shaft section, said conduit section, and said tubular section are concentric;
   said first control assembly includes a plate substantially perpendicular to said tubular section and having said cam slot therein;
   said second control assembly includes a plate substantially perpendicular to said conduit section and having said tooth notch therein;
   said third control assembly includes a plate substantially perpendicular to said shaft section and having said cam groove therein;
   said drive assembly includes a plate substantially perpendicular to said tubular and shaft sections and having said roller slot therein; and
   said support includes a pair of plates having said cam aperture therein and substantially containing said first, second, third, and drive plates therebetween.

4. The control mechanism of claim 3, wherein:
   said handle pivotal and resilient attachments are on the rod side of said journalled mount and said extension is on the opposite side of said mount, and said extension is substantially parallel to said shaft section and protrudes beyond the volume defined by said support plates;
   said tooth notch is aligned with said extension, and is in a portion of said second control assembly which is substantially parallel to said conduit section and extends beyond the volume defined by said support plates; and
   said handle notch is in a portion of said drive assembly which is substantially parallel to said shaft and tubular sections, and which extends beyond the volume defined by said support plates.

5. The control mechanism of claim 4, wherein:
   said regulating means includes a control panel secured to said vehicle, having a generally H-shaped slot therein through which said rod projects, said normal position of said rod substantially corresponding to the center of the short slot connecting the longer slots of the H pattern, with the rotational limits of said first, second, and third control assemblies established by said longer slots.

6. The control mechanism of claim 1, wherein:
said third control assembly includes a detent notch
said support includes a spring notch; and
detent means mounted on said support for locking the position of said third control assembly until force transmitted by said roller overcomes the lacking force of said detent, said detent means include;
a lever assembly pivotally attached to said support and having a pin for selective engagement with said detent notch; and
spring means for applying force between said spring notch and said lever pin.

7. The control mechanism of claim 6, wherein:
said handle pivotal and resilient attachments are on the rod side of said journal mount and said extension is on the opposite side of said mount, and said extension is substantially correlal to said shaft section;
said tooth notch is aligned with said extension, and is in a portion or said second control assembly which is substantially parallel to said conduit section; and
said handle notch is in a portion of said drive assembly which is substantially parallel to said tubular and shaft sections.

8. The control mechanism of claim 6, wherein:
said shaft section, said conduit section and said tubular section are concentric;
said first control assembly includes a plate substantially perpendicular to said tubular section and having said cam slot therein;
said second control assembly includes a plate substantially perpendicular to said conduit section and having said tooth notch therein;
said third control assembly includes a plate substantially perpendicular to said shaft section and having said cam groove and said detent notch therein;
said drive assembly includes a plate substantially perpendicular to said tubular and shaft sections and having said roller slot therein; and
said support includes a pair of plates having said cam aperture and said spring notch therein, and substantially containing said first, second, third and drive plates therebetween.

9. The control mechanism of claim 8, wherein:
said handle pivotal and resilient attachments are on the rod side of said journalled mount and said extension is on the opposite side of said mount, and said extension is substantially parallel to said shaft section and protrudes beyond the volume defined by said support plates;
said tooth notch is aligned with said extension, and is in a portion of said second control assembly which is substantially parallel to said conduit section and extends beyond the volume defined by said support plates; and
said handle notch is in a portion of said drive assembly which is substantially parallel to said shaft and tubular sections, and which extends beyond the volume defined by said support plates.

10. The control mechanism of claim 9, wherein:
said regulating means includes a control panel secured to said vehicle, having a generally H-shaped slot therein through which rod projects, said normal position of said rod substantially corresponding to the center of the short slot connecting the longer slots of the H pattern, with the rotational elements of said first, second, and third control assemblies established by said longer slots.

11. A control mechanism for a vehicle having a range transmission incorporating a range lever selectively establishing the high and low speed range, a reverse lever selectively establishing the engagement and disengagement of reverse gear and a park lever selectively establishing engagement and disengagement of the park gear lock, said mechanism including, in combination:
a transition portion therebetween, a roller retainer and a shaft aperture;
a first control assembly rotatably carried by said support in said shaft aperture, having a tubular section through said shaft aperture and a cam slot corresponding positionally to said transition and first cam aperture elements;
first means for operably connecting said first control assembly and said reverse lever;
a second control assembly rotatably carried by said first control assembly in said tubular section, having a conduit section through said tubular section and a tooth notch;
second means for operably connecting said second control assembly and said range lever;
a third control assembly rotatably carried by said second control assembly in said conduit section, having a shaft section through said conduit section and a cam groove corresponding positionally to said transition portion and second element;
a third means for operably connecting said third control assembly and said park lever;
a drive assembly rotatably carried by said tubular section and said shaft section, having a roller slot and a handle notch;
a roller constrained by said roller retainer and positioned within said transition cam element, said cam slot, said cam groove, and said roller slot;
a handle rotatably and pivotally carried by said shaft section having a rod selectively engageable with said handle notch and an extension selectively engageable with said tooth notch upon pivotal movement of said handle;
means pivotally and resiliently attached to said handle and journalled to said shaft section for mounting said handle, said means including a centering spring urging said handle to a normal position about said pivotal connection;
means for regulating movement of said handle by selective engagement of said tooth notch or said handle notch when said handle is in its normal position about said pivotal connection and operative, when said handle extension engages said tooth notch, to produce rotation of said second control assembly, and operative, when said handle rod engages said handle notch, to produce selective rotation of said first and third control assemblies of interaction of said roller in said cam aperture, said cam roller slot, said cam groove, and said cam slot.

12. The control mechanism of claim 11, wherein:
said handle pivotal and resilient attachments are on the rod side of said journal mount and said extension is on the opposite side of said mount, and said extension is substantially parallel to said shaft section;
said tooth notch is aligned with said extension, and is in a portion of said second control assembly which is substantially parallel to said conduit section; and
said handle notch is in a portion of said drive assembly which is substantially parallel to said tubular and shaft sections.

13. The control mechanism of claim 11, wherein:
said shaft section, said conduit section, and said tubular section are concentric;
said first control assembly includes a plate substantially perpendicular to said tubular section and having said cam slot therein;
said second control assembly includes a plate substantially perpendicular to said conduit section and having said tooth notch therein;
said third control assembly includes a plate substantially perpendicular to said shaft section and having said cam groove therein;
said drive assembly includes a plate substantially perpendicular to said tubular and shaft sections and having said roller slot therein; and
said support includes a pair of plates having said cam aperture therein and substantially containing said first, second, third, and drive plates therebetween.

14. The control mechanism of claim 13, wherein:
said handle pivotal and resilient attachments are on the rod side of said journalled mount and said extension is on the opposite side of said mount, and said extension is substantially parallel to said shaft section and protrudes beyond the volume defined by said support plates;
said tooth notch is aligned with said extension, and is in a portion of said second control assembly which is substantially parallel to said conduit section and extends beyond the volume defined by said support plates; and
said handle notch is in a portion of said drive assembly which is substantially parallel to said shaft and tubular sections, and which extends beyond the volume defined by said support plates.

15. The control mechanism of claim 14, wherein:
said regulating means includes a control panel secured to said vehicle, having a generally H-shaped slot therein through which said rod projects, said normal position of said rod substantially corresponding to the center of the short slot connecting the longer slots of the H pattern, with the rotational limits of said first, second, and third control assemblies established by said longer slots.

16. The control mechanism of claim 11, wherein:
said third control assembly includes a detent notch;
said support includes a spring notch; and
detent means mounted on said support for locking the position of said third control assembly until force transmitted by said roller overcomes the lacking force of said detent, said detent means include;
a lever assembly pivotally attached to said support and having a pin for selective engagement with said detent notch; and
spring means for applying force between said spring notch and said lever pin.

17. The control mechanism of claim 16, wherein:
said handle pivotal and resilient attachments are on the rod side of said journal mount and said extension is on the opposite side of said mount, and said extension is substantially parallel to said shaft section;
said tooth notch is aligned with said extension, and is in a portion of said second control assembly which is substantially parallel to said conduit section; and
said handle notch is in a portion of said drive assembly which is substantially parallel to said tubular and shaft sections.

18. The control mechanism of claim 16, wherein:
said shaft section, said conduit section and said tubular section are concentric;
said first control assembly includes a plate substantially perpendicular to said tubular section and having said cam slot therein;
said second control assembly includes a plate substantially perpendicular to said conduit section and having said tooth notch therein;
said third control assembly includes a plate substantially perpendicular to said shaft section and having said cam groove and said detent notch therein;
said drive assembly includes a plate substantially perpendicular to said tubular and shaft sections and having said roller slot therein; and
said support includes a pair of plates having said cam aperture and said spring notch therein, and substantially containing said first, second, third and drive plates therebetween.

19. The control mechanism of claim 18, wherein:
said handle pivotal and resilient attachments are on the rod side of said journalled mount and said extension is on the opposite side of said mount, and said extension is substantially parallel to said shaft section and protrudes beyond the volume defined by said support plates;
said tooth notch is aligned with said extension, and is in a portion of said second control assembly which is substantially parallel to said conduit section and extends beyond the volume defined by said support plates; and
said handle notch is in a portion of said drive assembly which is substantially parallel to said shaft and tubular sections, and which extends beyond the volume defined by said support plates.

20. The control mechanism of claim 19, wherein:
said regulating means includes a control panel secured to said vehicle, having a generally H-shaped slot therein through which rod projects, said normal position of said rod substantially corresponding to the center of the short slot connecting the longer slots of the H pattern, with the rotational elements of said first, second, and third control assemblies established by said longer slots.

* * * * *